May 5, 1959     A. KRASKER     2,885,290

INSTANTANEOUS COFFEE BEVERAGE

Filed Dec. 19, 1955

INVENTOR.
ABRAHAM KRASKER

United States Patent Office

2,885,290
Patented May 5, 1959

2,885,290

INSTANTANEOUS COFFEE BEVERAGE

Abraham Krasker, Brookline, Mass.

Application December 19, 1955, Serial No. 554,043

9 Claims. (Cl. 99—77.1)

This invention relates to the art of making a genuine coffee beverage. In particular, it relates to a method and device for the instantaneous preparation of fresh single servings of coffee beverage from finely ground genuine coffee.

Although many methods have been suggested and described for the preparation of coffee beverage, all that has hitherto been described have been time-consuming. In addition, there has been no method hitherto described which is practical for the making of a satisfying single serving of genuine coffee. Modified coffee such as the so-called "instant coffee" can be used to yield a quick single serving of modified coffee beverage by the addition of boiling water to the modified coffee powder or concentrate. However, the flavor of modified coffee is considerably different from that of genuine coffee in that the fresh aroma and fresh flavor are missing from modified coffee.

A primary object of my invention is to provide a new method and device for preparing substantially instantaneous single servings of genuine fresh coffee beverage directly into a drinking cup. It is clean and sanitary. The coffee grounds are quickly and safely disposed of. There is no sediment left in the cup after the coffee is consumed. It is economical in that each individual cupful can be prepared at exactly the desired strength. It is faster than previously described methods. It is made of heat resistant, low heat conductive material making it easy to handle. There is no foreign flavor resulting from the component parts of the device used as it is made of coffee-inert material.

Further objects of the invention will hereinafter appear from the following description illustrative of the invention and shown in the accompanying drawings in which.

The device consists of a receptacle adapted to be securely seated on or inside of the rim of a conventional coffee cup. This receptacle is, preferably, an inverted frustro-conical tube adapted to hold a filter paper of similar shape and contour and of similar volume to said tube. This tubular-shaped device has a flat open transverse bottom provided with a grid or similar openings for supporting the filter. The top diameter is slightly larger than the inner rim diameter of the cup while the bottom diameter is slightly smaller so that the device will sit in the cup but extending only slightly therein. The sides of the device, in one embodiment, are provided with a multiplicity of longitudinal ribs for forming air channels between the cup interior and atmosphere. Another embodiment has a multiplicity of seating projections extending laterally from the sides of the frustrum while still another has a peripheral seating lip also extending laterally from the sides of the frustrum.

This seating lip may be provided with vertical air channels or have an open tube depending from its upper surface or be provided with a fluid level indicating float or any combination of these components.

The material used for making the device should preferably be a coffee and water inert moldable thermoplastic or thermosetting resin or plastic, heat-insulating in nature.

The filter paper used with the receptacle is preferably of fitted cup shape and has a good wet strength, but ordinary filter paper discs can be used, albeit with more difficulty. Preferably, the fitted filter cup is made of one piece with its edges mechanically serrated together, rather than use a foreign substance such as adhesive.

Figure 1:
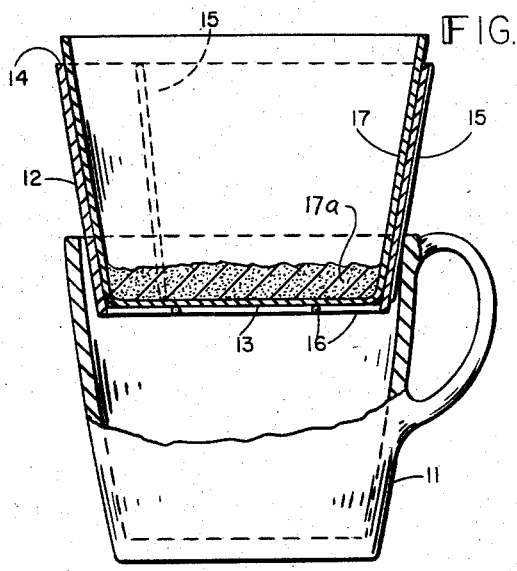
Figure 1 is a longitudinal vertical cross-sectional view of a preferred embodiment inserted in a drinking cup partly broken away showing exterior ribs.
Figure 2:
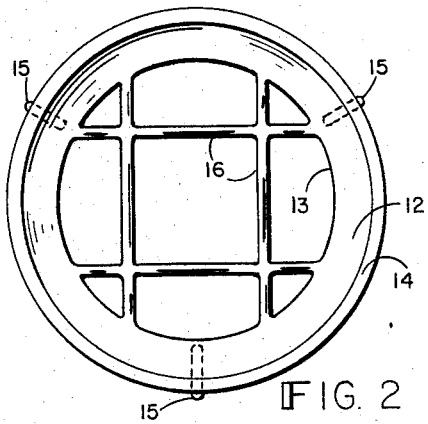
Figure 2 is a bottom view of the device showing one type of the filter supporting grid.

Referring to Figures 1 and 2 of the drawings, there is shown a conventional coffee cup 11. Associated therewith is an inverted frustro-conical receptacle 12 with a flat bottom 13 which is smaller in diameter than the top rim 14 and is provided with longitudinal ribs 15. The bottom 13 has a grid 16 to support a filter paper 17 of the same shape as the interior contour of the receptacle 12. The ground coffee 17a is placed in the filter paper.

Figure 3:
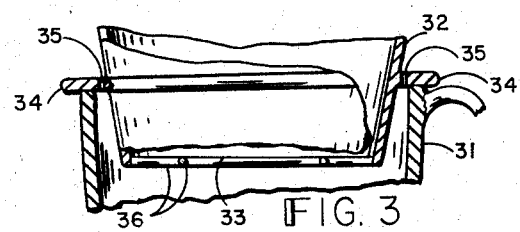
Figure 3 is a side view and section partially broken away of another embodiment showing a peripheral seating lip.

Referring to Figure 3, there is shown a conventional coffee cup 31. Associated therewith is a receptacle 32 with a flat bottom 33. Extending from the side of the receptacle is a peripheral seating lip 34 perforated with a multiplicity of air vents 35. The bottom 33 has a grid 36 to support a filtering element of the same shape as the interior contour of the receptacle 32.

Figure 4:
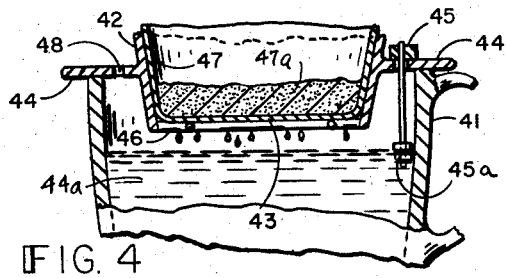
Figure 4 shows Figure 3 provided with a depending float in the peripheral lip.

Figure 4 shows a conventional coffee cup 41 with an associated receptacle 42 having a flat bottom 43. Extending from the side of the receptacle is a peripheral seating lip 44 provided with mount 45 holding a coffee level indicating float 45a which is raised above the upper surface of said lip when the level of the prepared beverage 44a rises to a predetermined level in the drinking cup. The bottom 43 has a grid 46 to support a filter paper 47 of the same shape as the interior contour of the receptacle 42 and which holds ground coffee 47a.

Figure 5:
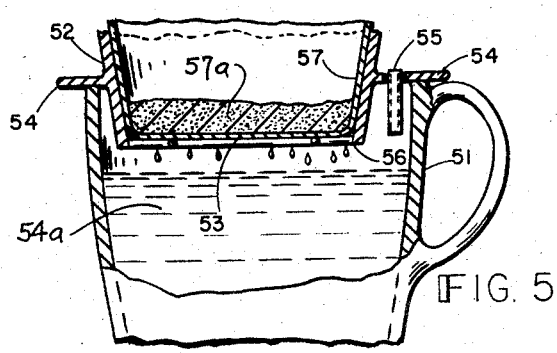
Figure 5 shows Figure 3 provided with a vertical open tube depending from peripheral lip.

In Figure 5 there is shown a conventional coffee cup 51 with an associated receptacle 52 having a flat bottom 53. Extending from the side of the receptacle is a peripheral seating lip 54 provided with a depending open tube 55 through which the rising level of the prepared beverage 54a may be observed. The bottom 53 has a grid 56 to support a filter paper 57, holding the ground coffee 57a.

Figure 6:
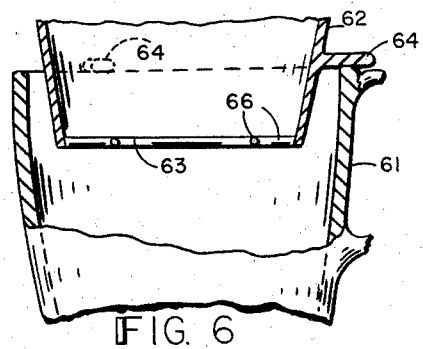
Figure 6 is a longitudinal vertical cross-sectional view of still another embodiment showing lateral seating projections.
Figure 7:
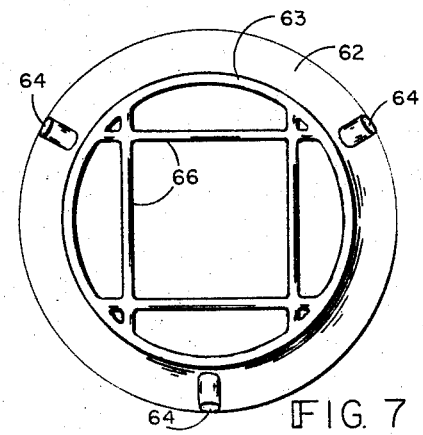
Figure 7 is a bottom view of Figure 6.

Figures 6 and 7 show a conventional coffee cup 61 with an associated receptacle 62 having a flat bottom 63. Extending from the side of the receptacle are a multiplicity of lateral projections 64 for seating the receptacle on the rim of the cup. The bottom 63 has a grid 66 for supporting the filtering element.

In operation, the filtering element is placed within the receptacle and seated in or on a conventional coffee cup. The desired amount of finely ground genuine coffee (e.g. "drip" grade) is evenly dispersed over the flat bottom of the filter paper. Hot water between about 180° F. and 212° F. is poured directly on to said positioned coffee allowing the filtrate to fall directly into the cup. When this resulting filtrate is observed to have reached the required height in the cup the receptacle containing the filter and coffee grounds should be removed from the cup. The coffee grounds should not be allowed to brew in the resulting filtrate as this detracts from the natural aroma and flavor of the freshly prepared beverage. The filter and coffee grounds may then be easily disposed of.

While the preferred embodiments of my invention have been described in detail, it will be understood that I do not wish to be limited to the particular construction set forth, since various changes in the form, material, proportions and arrangements of parts, and in the details of construction may be resorted to without departing from the spirit and scope of the invention, or destroying any of the advantages contained in the same, heretofore described and defined in the subjoined claims.

I claim:

1. A coffee maker for the preparation from finely ground genuine coffee of an individual serving of coffee directly into a drinking cup, comprising a tubular receptacle adapted to be seated adjacent to the rim of said cup and having an open top and a flat substantially open bottom, and a filtering element similar in shape and contour for insertion into and adjacent said receptacle, said receptacle being provided with means for allowing the escape of air from said cup as it is being filled.

2. A coffee maker for the preparation from finely ground genuine coffee of an individual serving of coffee directly into a drinking cup, comprising a tubular receptacle adapted to be seated adjacent to the rim of said cup and having an open top and a flat substantially open bottom, and a filtering element similar in shape and contour for insertion into and adjacent said receptacle, said receptacle being provided with a multiplicity of longitudinal ribs for forming air channels.

3. A coffee maker for the preparation from finely ground genuine coffee of an individual serving of coffee directly into a drinking cup, comprising a tubular receptacle adapted to be seated adjacent to the rim of said cup and having an open top and a flat substantially open bottom, and a filtering element similar in shape and contour for insertion into and adjacent said receptacle, said receptacle being provided with a peripheral seating lip extending laterally from its sides, said lip having at least one orifice extending between the cup interior and the outside air.

4. A coffee maker for the preparation from finely ground genuine coffee of an individual serving of coffee directly into a drinking cup, comprising a tubular receptacle adapted to be seated adjacent to the rim of said cup and having an open top and a flat substantially open bottom, and a filtering element similar in shape and contour for insertion into and adjacent said receptacle, said receptacle being provided with a peripheral seating lip extending laterally from its sides, said lip having an open tube depending from its upper surface into said cup interior.

5. A coffee maker for the preparation from finely ground genuine coffee of an individual serving of coffee directly into a drinking cup, comprising a tubular receptacle adapted to be seated adjacent to the rim of said cup and having an open top and a flat substantially open bottom, and a filtering element similar in shape and contour for insertion into and adjacent said receptacle, said receptacle being provided with a peripheral seating lip extending laterally from its sides, said lip being provided with a fluid level indicating float.

6. A coffee maker for the preparation from finely ground genuine coffee of an individual serving of coffee directly into a drinking cup, comprising a tubular receptacle adapted to be seated adjacent to the rim of said cup and having an open top and a flat substantially open bottom, and a filtering element similar in shape and contour for insertion into and adjacent said receptacle, said receptacle being provided with a multiplicity of seating projections extending laterally from its sides.

7. A filtering device for preparing from finely ground genuine coffee an individual, fresh, fully aromatic serving of coffee directly into a cup, comprising an inverted frustro-conical tube of heat-resisting, low heat conductive material shaped to seat in the upper portion of a drinking cup and a filtering element insert frustro-conical in shape seated in said tube, said tube having an open top and a substantially open transverse bottom filter supporting portion and lateral projections forming air channels with said cup.

8. A device for use in combination with a drinking cup for making from finely ground genuine coffee a fresh highly aromatic single serving of genuine coffee comprising a laterally-ribbed inverted conical frustrum made of substantially coffee-inert material and having its top diameter slightly larger than the open diameter of a cup; the bottom of said frustrum being substantially open and having a diameter slightly smaller than said cup diameter but extending only slightly therein, and a unitary filter paper with bottom and sides shaped to seat in the bottom portion of, and adjacent to said frustrum.

9. A device for preparing from finely ground genuine coffee, an individual serving of coffee directly into a drinking cup, comprising a frustro-conical tube shaped to fit in a cup-like drinking vessel of similar volume to said tube, said tube having an open top and a substantially open transverse bottom and exterior ribs forming channels with the vessel for the passage of air and adapted to hold a filtering element of similar shape and contour.

References Cited in the file of this patent

UNITED STATES PATENTS

| | | |
|---|---|---|
| 1,456,010 | Richheimer | May 22, 1923 |
| 1,876,474 | Starkey | Sept. 6, 1932 |
| 2,273,422 | Schroeder | Feb. 17, 1952 |
| 2,743,664 | Dale | May 1, 1956 |
| 2,835,191 | Clurman | May 20, 1958 |

FOREIGN PATENTS

| | | |
|---|---|---|
| 451,197 | Great Britain | July 31, 1936 |
| 902,896 | France | Nov. 2, 1943 |
| 660,983 | Germany | Sept. 6, 1935 |